United States Patent
Rolly et al.

(10) Patent No.: US 6,988,796 B2
(45) Date of Patent: Jan. 24, 2006

(54) NON-REACTIVE INK VEHICLE FORMULATION

(75) Inventors: Luanne J. Rolly, Corvallis, OR (US); Paul Tyrell, Corvallis, OR (US); Charles L Thierheimer Jr., Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 111 days.

(21) Appl. No.: 10/649,064

(22) Filed: Aug. 27, 2003

(65) Prior Publication Data

US 2005/0030361 A1 Feb. 10, 2005

Related U.S. Application Data

(63) Continuation of application No. 10/094,861, filed on Mar. 11, 2002, now Pat. No. 6,722,765.

(51) Int. Cl.
*B41J 2/01* (2006.01)
*B41J 2/165* (2006.01)

(52) U.S. Cl. .......................... 347/100; 347/22
(58) Field of Classification Search ................ 347/100, 347/96, 101, 95, 22, 29, 32, 33, 34; 106/31.13, 106/31.6, 31.27; 523/160
See application file for complete search history.

(56) References Cited

U.S. PATENT DOCUMENTS

| | | | |
|---|---|---|---|
| 5,302,197 A | 4/1994 | Wickramanayke et al. | |
| 5,428,383 A | 6/1995 | Shields et al. | |
| 5,534,051 A | 7/1996 | Lauw | |
| 5,725,641 A | 3/1998 | MacLeod | |
| 5,766,327 A | 6/1998 | Maze | |
| 5,786,830 A * | 7/1998 | Su et al. ...................... | 347/33 |
| 5,788,754 A | 8/1998 | Deardurff et al. | |
| 5,851,273 A | 12/1998 | Morris et al. | |
| 5,858,075 A | 1/1999 | Deardurff | |
| 5,954,866 A * | 9/1999 | Ohta et al. ................ | 106/31.89 |
| 6,004,389 A | 12/1999 | Yatake | |
| 6,184,268 B1 | 2/2001 | Nichols et al. | |
| 6,302,949 B1 | 10/2001 | Peter | |
| 2002/0198289 A1 * | 12/2002 | Gummeson ................. | 523/400 |

FOREIGN PATENT DOCUMENTS

| | | |
|---|---|---|
| EP | 0 900 831 | 3/1999 |
| EP | 0956960 A2 | 11/1999 |
| EP | 0956960 A2 * | 11/1999 |
| EP | 1 122 288 | 8/2001 |

OTHER PUBLICATIONS

HP Patent Application 10015559; filed Oct. 29, 2001, U.S. Appl. No. 10/000,043.
HP Patent Application 100200822, filed Mar. 11, 2002, U.S. Appl. No. 10/649064.

* cited by examiner

*Primary Examiner*—Manish S. Shah

(57) ABSTRACT

The present invention is drawn to ink-vehicle compositions and systems adapted for use in low dye load ink compositions, contain no salts, and provide low orifice plate puddling. Specifically, a non-reactive ink-vehicle for low dye-load ink-jet inks can comprise an effective amount of water; from 1% to 3% by weight of a 1,5-pentanediol co-solvent; from 7.5% to 15% by weight of a trimethylolpropane co-solvent; and from 5% to 8% by weight of a third co-solvent, with the proviso that the ink-vehicle comprise at least 20% by weight of total co-solvent. Alternatively, a non-reactive ink-vehicle for low dye-load ink-jet inks can comprise an effective amount of water; from 1% to 3% by weight of a 1,5-pentanediol co-solvent; from 7.5% to 15% by weight of a trimethylolpropane co-solvent; and from 0.05% to 0.25% of a buffer consisting essentially of 2-amino-2-(hydroxymethyl)-1,3-propanediol. These ink-jet ink vehicles can be used in swappable ink-jet pen systems having a common service station.

12 Claims, No Drawings

NON-REACTIVE INK VEHICLE FORMULATION

The present application is a continuation of U.S. patent application Ser. No. 10/094,861, filed on Mar. 11, 2002 now U.S. Pat. No. 6,722,765.

FIELD OF THE INVENTION

The present invention is drawn to the area of ink-jet imaging. More specifically, the present invention is drawn to ink-jet ink vehicles that are adapted for use in low dye load inks, contain no salts, and provide low orifice plate puddling.

BACKGROUND OF THE INVENTION

In recent years, computer printer technology has evolved to a point where very high resolution images can be transferred to various types of media, including paper. One particular type of printing involves the placement of small drops of a fluid ink onto a media surface in response to a digital signal. Typically, the fluid ink is placed or jetted onto the surface without physical contact between the printing device and the surface.

Within this general technique, the specific method that the ink-jet ink is deposited onto the printing surface varies from system to system, and can include continuous ink deposit and drop-on-demand ink deposit.

With regard to continuous printing systems, inks used are typically based on solvents such as methyl ethyl ketone and ethanol. Essentially, continuous printing systems function as a stream of ink droplets are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and solvents such as glycols. Essentially, with these systems, ink droplets are propelled from a nozzle by heat or by a pressure wave such that all of the ink droplets ejected are used to form the printed image.

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, etc.

In general, ink-jet inks are either dye- or pigment-based inks. Both are typically prepared in an ink vehicle that contains the dye and/or the pigment. Dye-based ink-jet inks generally use a liquid colorant that is usually water-based to turn the media a specific color. Conversely, pigmented inks typically use a solid or dispersed colorant to achieve color.

Many properties that are desirable for ink-jet printing include good edge acuity and optical density of an image on a media substrate, good dry time of the ink on the substrate, adhesion to the substrate, lack of deviation of ink droplets when fired, presence of all dots, resistance of the ink after drying to water and other solvents, long-term storage stability, good dot size and dot gain, color-to-color bleed alleviation, acceptable coalescence, long term reliability without corrosion or nozzle clogging, good light fastness, good wet fastness, low humid hue shift, and other known properties. Many inks are known to possess some of the above described properties. However, few inks are known that possess all of these properties, since an improvement in one property often results in the degradation in another property. Accordingly, investigations continue into developing ink formulations that have improved properties and that do not improve one property at the significant detriment of another. However, many challenges still remain to further improve the image quality and lightfastness of ink-jet prints without sacrificing pen performance and reliability.

SUMMARY OF THE INVENTION

It has been recognized that the use of certain vehicle components in certain combinations provide a non-reactive ink vehicle that works well with low dye load magenta and cyan dyes, and medium dye load black dyes. This is particularly useful when such ink vehicles (with their respective dye component) are used in an ink-jet pen that is designed to share a service station with a pen containing acrylate dispersed pigment-based ink. Because the ink vehicles of the present invention are non-reactive with these and other ink-jet inks, the sharing of a service station does not result in increased orifice crusting.

In accordance with principles of an embodiment of the present invention, a non-reactive ink-vehicle for low dye-load ink-jet inks can comprise an effective amount of water; from 1% to 3% by weight of a 1,5-pentanediol co-solvent; from 7.5% to 15% by weight of a trimethylolpropane co-solvent; and from 5% to 8% by weight of a third co-solvent, with the proviso that the ink-vehicle comprise at least 20% by weight of total co-solvents.

In an alternative embodiment, a non-reactive ink-vehicle for low dye-load ink-jet inks can comprise an effective amount of water; from 1% to 3% by weight of a 1,5-pentanediol co-solvent; from 7.5% to 15% by weight of a trimethylolpropane co-solvent; and from 0.05% to 0.25% of a buffer consisting essentially of 2-amino-2-(hydroxymethyl)-1,3-propanediol.

A system having swappable ink-jet pens for use in a single service station can comprise a first ink-jet pen containing a pigment-based ink-jet ink; a second ink-jet pen containing a dye-based ink-jet ink that is non-reactive with the pigment-based ink-jet ink; and a single service station configured for servicing the first ink-jet pen and the second ink-jet pen. Preferably, the present system can function by utilizing swappable pens wherein substantially no reaction between the pigment-based ink-jet ink and the dye-based ink-jet ink occurs at the service station, the first ink-jet pen, or the second ink-jet pen upon swapping the first ink-jet pen for the second ink-jet pen, or vice versa.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

As used herein, "effective amount" refers to the minimal amount of a substance or agent, which is sufficient to achieve a desire effect. For example, an effective amount of a "surfactant" is the minimum amount required in order to create a dye-based ink-vehicle, while maintaining properties in accordance with embodiments of the present invention.

As used herein, "liquid vehicle" or "ink vehicle" refers to the vehicle in which colorant is placed to form an ink. Many ink vehicles and vehicle components are known in the art. However, the use of specific components at specific amounts can provide improved ink-jet ink characteristics. Typical ink vehicles can include a mixture of a variety of different agents, such as surfactants, solvents, co-solvents, buffers, biocides, sequestering agents, viscosity modifiers, surface-active agents, and water.

"Non-reactive ink-vehicle" refers to ink vehicles that do not contain reactive salts. However, dyes used in conjunction with non-reactive ink-vehicles can be a salt, provided the salt content is low enough that the ink-jet ink formulation is substantially non-reactive.

With this in mind, the present invention is drawn to the area of ink-jet imaging. More specifically, the present invention is drawn to ink-jet ink vehicles that are adapted for use in low dye load inks, contain no salts, and provide low orifice plate puddling. Particularly, it has been recognized that specific ink-jet ink vehicles containing a low magenta or cyan dye load (less than 3% by weight), or a low to medium black dye load (less than 5% by weight), can be jetted effectively from print heads designed and tuned for jetting very different ink-jet inks, such as salt-containing inks having over 8% by weight 1,5-pentanediol.

A typical formulation for an ink vehicle useful in the practice of this invention can include three co-solvents. Such co-solvents include 1,5-pentanediol present at from 1% to 3% by weight, trimethylolpropane at from 7.5% to 15% by weight, and a third co-solvent present at from 5% to 8% by weight, with the proviso that the total co-solvent weight ratio is greater than 20% by weight. In this embodiment, an optional buffer consisting essentially of 2-amino-2-(hydroxymethyl)-1,3-propanediol can be present.

Alternatively, a non-reactive ink-vehicle for low dye-load ink-jet ink can comprise an effective amount of water; from 1% to 3% by weight of a 1,5-pentanediol co-solvent; from 7.5% to 15% by weight of a trimethylolpropane co-solvent; and from 0.05% to 0.25% of a buffer consisting essentially of 2-amino-2-(hydroxymethyl)-1,3-propanediol. In this embodiment, an optional third co-solvent can be present.

Classes of co-solvents that can be used as the third co-solvent can include aliphatic alcohols, aromatic alcohols, diols, glycol ethers, polyglycol ethers, pyrrolidines, pyrrolidinones, and mixtures thereof, with the proviso that no more than 10 carbons be present with respect to each third co-solvent. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, substituted and unsubstituted pyrrolidines, substituted and unsubstituted pyrrolidinones, and the like. Though there is some degree of variance that can occur with respect to the third co-solvent, the ink-vehicle formulation must include 1,5-pentanediol and trimethylolpropane. In one embodiment, a third co-solvent can preferably be 2-pyrrolidinone.

In addition to the vehicle components described above, a surfactant component can also be present, preferably a combination of a non-ionic surfactant and an anionic surfactant. The surfactant component can comprise alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of total surfactant added to the formulation of this invention can range from 1% to 5% by weight. In one embodiment, the total surfactant can include from 1% to 3% by weight of one or more non-ionic surfactant, and from 0.1% to 1% by weight of one or more anionic surfactant. In one embodiment, the nonionic surfactant can be TERGITOL 15-S-5, TERGITOL 15-S-7, or combinations thereof. In another embodiment, the anionic surfactant can be DOWFAX 8390, for example.

It is often desirable with respect to ink-jet ink formulations to have a buffer present in order help maintain a stable pH during storage as well as during operating conditions. In accordance with the present invention, some buffers can contribute to undesired properties, particularly when in the presence of a nonionic surfactant. For example, certain buffer/nonionic surfactant combinations can lower what is known as the cloud point to an extent that the nonionic surfactant will not stay in solution at room temperature (or slightly above room temperature), making the ink unsuitable for effective use. In accordance with this principle, because the ink-vehicle formulations of the present invention are specific with respect to functionality, there are many buffers used in the ink-jet ink arts that are not desirable for use. For example, 4-morpholineethanesulfonic acid (MES) and 4-morpholinepropanesulfonic acid (MOPS) are not particularly useful with the present ink vehicles, particularly when used with low dye load formulations having one or more nonionic surfactant present. However, 2-amino-2-(hydroxymethyl)-1,3-propanediol (TRIZMA) can be used in the present ink-vehicles with improved results. Preferably, if the TRIZMA buffer is used, then it can be present at from 0.05% to 0.25% by weight. As an example, an ink vehicle prepared in accordance with the present invention having a TERGITOL nonionic surfactant present, and MOPS or MES buffer present instead of TRIZMA, at 40° C., two layers can form where the nonionic surfactant actually comes out of solution. As this is not desirable for effective use in accordance with the present invention, MOPS and MES are undesirable for use when the ink-jet ink also contains a nonionic surfactant component.

The balance of the formulation can be purified water, though other known vehicle components can be included, provided they are not specifically excluded by the present disclosure. Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R. T. Vanderbilt Co.), Proxel (ICI America), and combinations thereof. Sequestering agents such as EDTA (ethylenediaminetetraaceticacid) may be included to eliminate the deleterious effects of heavy metal impurities. From 0.001% to 2.0% by weight, for example, can be used. Viscosity modifiers may also be present, as well as other additives known to those skilled in the art to modify properties of the ink as desired. Such additives can be present at from 0.01% to 20% by weight.

In addition to the above ink-vehicle compositions, a system having swappable ink-jet pens for use in a single service station can comprise a first ink-jet pen containing a pigment-based ink-jet ink. The pigment-based ink-jet ink can comprise an acrylate dispersant, though this is not required. The system can also comprise a second ink-jet pen containing a dye-based ink-jet ink that is non-reactive with the pigment-based ink jet ink. Such a dye-based ink-jet ink can comprise from 0.1% to 4% by weight of a dye; and an ink-vehicle that is non-reactive with the pigment-based ink-jet ink, wherein the ink-vehicle comprises an effective amount of water, from 1% to 3% by weight of a 1,5-pentanediol co-solvent, and from 7.5% to 15% by weight of a trimethylolpropane co-solvent. Additionally, a single service station can be present that is configured for servicing the first ink-jet pen and the second ink-jet pen. Preferably, the present system can function by utilizing swappable pens wherein substantially no reaction between the pigment-based ink-jet ink and the dye-based ink-jet ink occurs at the service station, the first ink-jet pen, or the second ink-jet pen. In one embodiment, any residual pigment-based ink-jet ink remaining on the single service station after servicing and removal of the first ink-jet pen should not substantially react with the dye-based ink-jet ink upon servicing of the second ink-jet pen at the single service station. In another embodiment, residual dye-based ink-jet ink remaining on the single service station after servicing and removal of the second ink-jet pen should not substantially react with the pigment-based ink-jet ink upon servicing of the first ink-jet pen at the single service station.

The configuration described with respect to the above system can be useful for a number of purposes. For example, a four-color printing system comprising a dye-based cyan, a dye-based magenta, a dye-based yellow, and a pigment-based black can be effective for general color printing on plain paper. Such a pigment-based black works nicely for obtaining rich blacks on plain paper. However, if a full color image is to be printed on glossy photo media (such as HP Photo Premium plus paper), black pigment-based ink is less desirable for use. In this circumstance, a pen containing the black pigment-based ink-jet ink can be replaced with a pen containing a dye-based ink-jet ink comprising a vehicle of the present invention. Thus, because the ink-vehicles of the present invention do not contain reactive salts, the pen can be swapped with the pigment-based ink-jet ink pen without undesirable orifice plate or service station reactive properties, e.g., crusting.

In an alternative embodiment, the same three pen dye-based ink-jet ink set of cyan, magenta, and yellow can be used with a black pigment-based ink-jet ink. The black pigment-based ink-jet ink can be replaced with a compartmentalized pen having cyan dye-based ink-jet ink, a magenta dye-based ink-jet ink, and black dye-based ink-jet ink, thereby providing a six-ink dye-based ink set, i.e., two cyan, two magenta, one yellow, and one black. Thus, for plain paper printing, the three standard dye-based inks can be printed with a pigment-based ink, resulting in rich black and color images on plain paper.

Alternatively, when printing on photo paper designed primarily for dye-based inks, the three standard dye-based inks can be printed with an additional non-reactive dye-based cyan ink, an additional non-reactive dye-based magenta ink, and a non-reactive dye-based black ink. Exemplary pigment-based ink-jet inks that can be used that are non-reactive with the ink vehicles of the present invention are described in U.S. Pat. No. 5,302,197, which is incorporated herein by reference.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Preparation of Various Ink-Jet Inks in Accordance with an Embodiment of the Present Invention Three ink-jet inks were prepared in accordance with Tables 1–3 as follows:

TABLE 1

Magenta ink-jet ink

| INGREDIENT | Wt % |
| --- | --- |
| trimethylolpropane | 12.0% |
| 2-pyrrolidinone | 6.5% |
| 1,5-pentanediol | 2.0% |
| TERGITOL 15-S-5 | 1.0% |
| TERGITOL 15-S-7 | 1.0% |
| DOWFAX 8390 | 0.6% |
| TRIZMA buffer | 0.2% |
| EDTA | 0.0075% |
| magenta dye | 0.7% |
| water | Balance |

TABLE 2

Black ink-jet ink

| INGREDIENT | Wt % |
| --- | --- |
| trimethylolpropane | 12.0% |
| 2-pyrrolidinone | 6.5% |
| 1,5-pentaediol | 2.0% |
| TERGITOL 15-S-5 | 1.0% |
| TERGITOL 15-S-7 | 1.0% |
| DOWFAX 8390 | 0.6% |
| TRIZMA buffer | 0.2% |
| EDTA | 0.0075% |
| black dye | 3.8% |
| Water | Balance |

TABLE 3

Cyan ink-jet ink

| INGREDIENT | Wt % |
| --- | --- |
| trimethylolpropane | 12.0% |
| 2-pyrrolidinone | 6.5% |
| 1,5-pentanediol | 2.0% |
| TERGITOL 15-S-5 | 1.0% |
| TERGITOL 15-S-7 | 1.0% |
| DOWFAX 8390 | 0.6% |
| TRIZMA buffer | 0.2% |

TABLE 3-continued

Cyan ink-jet ink

| INGREDIENT | Wt % |
|---|---|
| EDTA | 0.0075% |
| cyan dye | 1.2% |
| water | Balance |

These three low to medium dye load ink-jet inks provided in Tables 1–3 above can be used with many higher dye load ink sets, but have been shown to be particularly useful when used in conjunction with the high dye load ink set identified by Hewlett-Packard part number HP C6657A. Additionally, because of the makeup of the ink-vehicle of the inks of Tables 1–3, a single service station can be shared with a black pigment-based ink-jet ink. In one embodiment, if all three ink-jet inks of Tables 1–3, each containing ink-vehicles in accordance with an embodiment of the present invention, are used with the three inks of the HP C6657A ink set, a six-ink ink set can be arranged that works well together. Further, any of the inks of Tables 1–3 contained in an ink-jet pen can be swapped with an ink-jet ink pen containing a black pigment-based ink-jet ink, even if the black pigment-based ink-jet ink comprises an acrylate dispersant. For example, a black pigment-based ink-jet ink pen can be swapped with pens containing the ink-jet inks of Table 1–3, including pens containing black pigment-based ink-jet inks such as those having pen number C6658A, manufactured by the Hewlett Packard Company. In addition to these advantages, the inks prepared according to Tables 1–3 provide for low to medium dye load ink-jet inks having good lightfastness, hue, chroma, and lightness.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is clai med is:

1. A system having at least two ink-jet pens swappable with one another for use with a single service station, comprising:
   a first ink-jet pen containing a pigment-based ink-jet ink;
   a second ink-jet pen containing a dye-based ink-jet ink, said dye-based ink-jet ink being substantially non-reactive with said pigment-based ink-jet ink; and
   a single service station configured for servicing the first ink-jet pen, and further being configured for servicing the second ink-jet pen when the first ink-jet pen has been replaced by the second ink-jet pen such that substantially no reaction between the pigment-based ink-jet ink and the dye-based ink-jet ink occurs at the service station.

2. A system as in claim 1, wherein residual pigment-based ink-jet ink remaining on the single service station after servicing and removal of the first ink-jet pen does not substantially react with the dye-based ink-jet ink upon servicing of the second ink-jet pen at the single service station.

3. A system as in claim 1, wherein residual dye-based ink-jet ink remaining on the single service station after servicing and removal of the second ink-jet pen does not substantially react with the pigment-based ink-jet ink upon servicing of the first ink-jet pen at the single service station.

4. A system as in claim 1, wherein the dye-based ink-jet ink comprises from 0.1% to 4% by weight of a dye; and further comprises an ink-vehicle having an effective amount of water, from 1% to 3% by weight of a 1,5-pentanediol co-solvent, and from 7.5% to 15% by weight of a trimethylolpropane co-solvent.

5. A system as in claim 4, wherein the ink vehicle further comprises from 5% to 8% by weight of a third co-solvent, with the proviso that the ink-vehicle comprise at least 20% by weight of total co-solvent.

6. A system as in claim 4, wherein the ink vehicle further comprises from 0.05% to 0.25% of a 2-amino-2-(hydroxymethyl)-1,3-propanediol buffer.

7. A system as in claim 4, wherein the ink vehicle further comprises a surfactant component having from 1% to 3% by weight of one or more non-ionic surfactant, and from 0.1% to 1% by weight of one or more anionic surfactant.

8. A system as in claim 1, wherein the pigment-based ink-jet ink comprises an effective amount of acrylate dispersant.

9. A system having swappable ink-jet pens for use with a single service station, comprising:
   a first ink-jet pen containing a pigment-based ink-jet ink;
   a second ink-jet pen containing a dye-based ink-jet ink, said dye-based ink-jet ink being substantially non-reactive with said pigment-based ink-jet ink, wherein the dye-based ink-jet ink comprises from 0.1% to 4% by weight of a dye and an ink-vehicle including water, from 1% to 3% by weight of a 1,5-pentanediol co-solvent, and from 7.5% to 15% by weight of a trimethylolpropane co-solvent; and
   a single service station configured for servicing the first ink-jet pens and further being configured for servicing the second ink-jet pen when the first ink-jet pen has been replaced by the second ink-jet pen such that substantially no reaction between the pigment-based ink-jet ink and the dye-based ink-jet ink occurs at the service station.

10. A system as in claim 9, wherein the ink vehicle further comprises from 5% to 8% by weight of a third co-solvent, with the proviso that the ink-vehicle comprise at least 20% by weight of total co-solvent.

11. A system as in claim 9, wherein the ink vehicle further comprises from 0.05% to 0.25% of a 2-amino-2-(hydroxymethyl)-1,3-propanediol buffer.

12. A system as in claim 9, wherein the ink vehicle further comprises a surfactant component having from 1% to 3% by weight of one or more non-ionic surfactant, and from 0.1% to 1% by weight of one or more anionic surfactant.

\* \* \* \* \*

UNITED STATES PATENT AND TRADEMARK OFFICE
CERTIFICATE OF CORRECTION

PATENT NO. : 6,988,796 B2 Page 1 of 1
APPLICATION NO. : 10/649064
DATED : January 24, 2006
INVENTOR(S) : Rolly et al.

It is certified that error appears in the above-identified patent and that said Letters Patent is hereby corrected as shown below:

Col. 8 (line 41), delete "pens" and insert therefor --pen,--.

Signed and Sealed this

Eighth Day of August, 2006

JON W. DUDAS
*Director of the United States Patent and Trademark Office*